Patented May 6, 1941

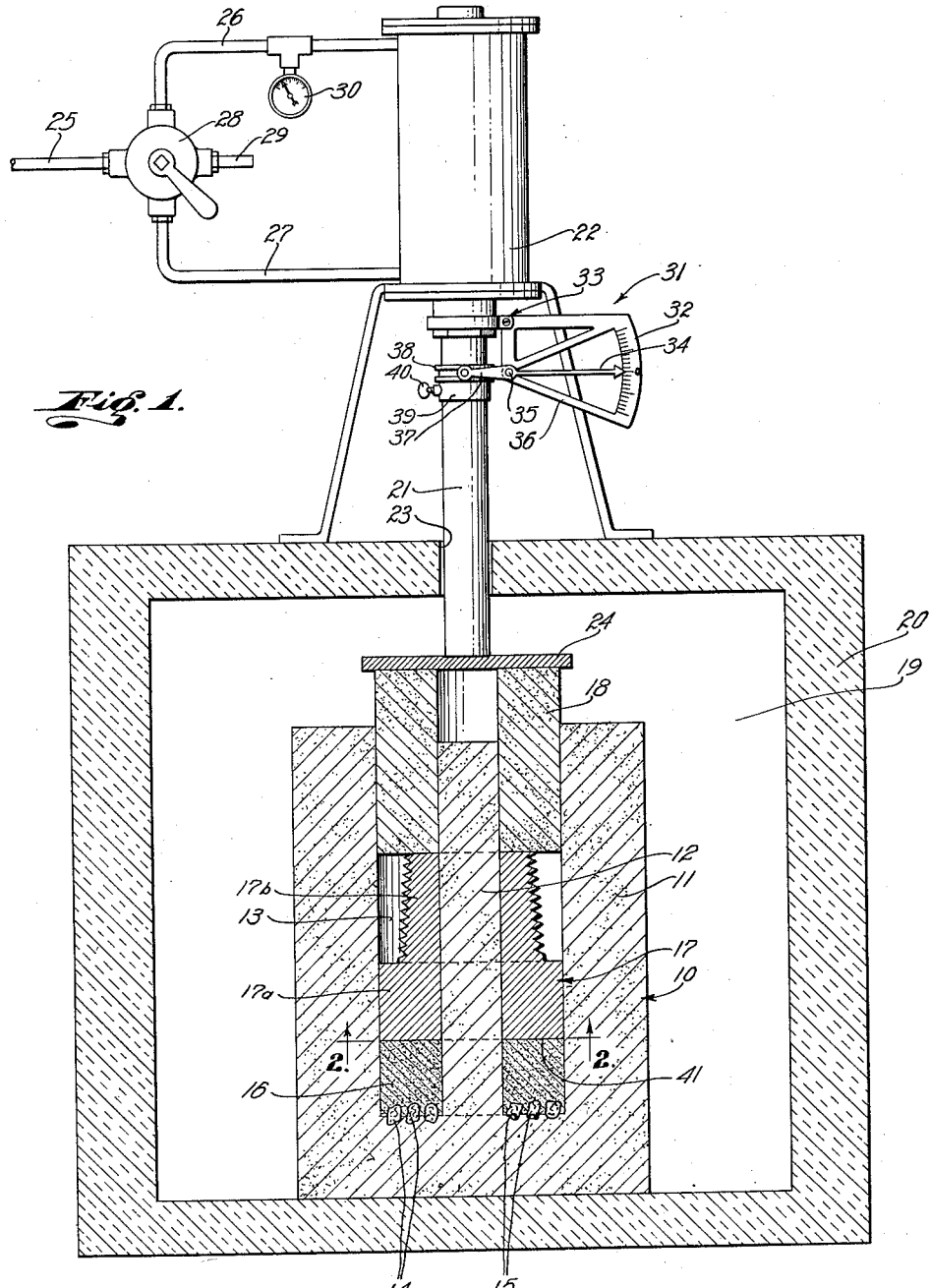

2,240,829

UNITED STATES PATENT OFFICE 2,240,829

CUTTING TOOL AND METHOD OF MAKING SAME

Arthur J. Bevillard, Anaheim, Calif., assignor, by direct and mesne assignments, to Bevil Corporation, Anaheim, Calif., a corporation of California Application September 27, 1939, Serial No. 296,785

8 Claims. (Cl. 22—202)

This invention has to do with the manufacture of cutting and abrading tools, adaptable generally for grinding, drilling or turning operations, and in which the harder cutting edges or surfaces are presented by individual cutting elements retained in a matrix of suitable metal or metallic alloy. While in certain of its broad aspects the invention contemplates the use of any suitable hard cutting elements, for example fused aluminum oxide, silicon carbide, metallic carbides, boron compounds or alloys, in other and more specific aspects the invention is concerned with improvements in the manufacture of diamond cutter tools. The invention therefore will be described with that objective in view, both as a typical embodiment of those broad aspects and an illustrative adaptation specifically of diamond tool manufacture.

It has been the practice for some time to make diamond cutter tools, circular drills for example, by placing and retaining the diamonds in a sintered matrix of powdered metal or alloy metal combinations. According to the usual method, the powdered matrix metal is placed in contact with the diamonds in a suitable mold or die, and then is subjected to extremely high pressure to compact the metal to the shape of the mold and at the same time to reduce the porosity of the matrix body. The metal then is heated to what is commonly termed a sintering temperature, sufficiently high to cause the metal particles to weld together at their boundaries and form, upon cooling, a coherent mass. At a sintering temperature the particles weld together, as I have stated, at their boundaries, and do not become completely melted so that together they form a liquid solution; nor does the matrix body reach a state of fluidity such that, under relatively low pressure, it will flow readily and harden into a substantially non-porous mass. In other words, a sintered matrix does not become a solidly cast body, a distinction which, for the purposes of this invention, is of primary importance and should be clearly borne in mind.

Experience in drilling operations using drills in which the diamonds are held in a sintered matrix such as I have described, has demonstrated the desirability of improving the quality of the matrix and the bond between the diamonds and the matrix metal. Because of its porosity and relatively heterogeneous composition, the matrix has comparatively low abrasive resisting qualities and strength, for example low resistance to shearing at the base of the diamond cutters, with the result that the matrix as a whole, and locally about the diamonds, wears away more rapidly than is most desirable. Also the metal is less resistant to impact and shock because of its granularity and porosity. These same characteristics of the metal produce a relatively weak bond between the metal and the diamonds, with the result that often times when the metal has become worn away sufficiently to only partly expose the diamonds, or past their largest diameters, the diamonds will loosen and become lost, a matter of serious concern because of their cost. Another reason for the relative weakness in the diamond-matrix bond is the fact that others heretofore have avoided any chemical affinity or reaction between the matrix metal and the diamond, on the theory that such reaction or affinity would weaken the diamond or so reduce its size as to preclude desired repeated use of the diamonds. Consequently, the bond strength has been limited to that resulting simply from physical confinement of the diamond within the matrix metal.

One of my main objects is to retain the diamonds within a cast matrix, and in so doing to greatly improve not only the strength and wear resisting qualities of the matrix itself, but also to form a much stronger bond between the diamonds and the matrix than has been possible in any known instance of which I am aware. In accordance with the invention, a suitable matrix metal or alloy is heated together with the diamonds embedded therein, to a temperature beyond the sintering temperature of the metal. I heat the matrix to a temperature at which the metal will flow, at least under applied low pressure, and preferably to a temperature at which the metal becomes substantially completely fluid. Simultaneously, sufficient, though not necessarily great pressure, is applied to cause the metal to flow about and in intimate contact with the diamonds, and to accurately assume the shape of the mold. Application of pressure also expels virtually all gases from the metal so that upon hardening, it forms a cast, non-porous body. Being heated to a melting temperature, the metallic constituents of the alloy form a liquid solution which, upon hardening, results in a completely formed alloy of uniform and homogenous composition. The superior strength and wear resisting qualities of such a cast matrix, as compared with the usual sintered product, has been demonstrated by comparisons of the two types in actual and extensive drilling operations.

Another feature of the invention which I believe represents a distinct departure from past practices, is in the nature of the bond that may be formed between the diamonds and the cast matrix. Microscopic observations of diamonds removed or severed from the matrix indicate that under the conditions existing during the diamond setting and casting process, a chemical reaction or affinity may exist between the diamonds and metal to produce localized changes in the alloy composition at the diamond surfaces, and small pitted areas in those surfaces due to reaction of the diamond carbon with the metal. These pitted areas are of microscopic size, and so small as not to reduce appreciably the body size of the diamond or its ultimate wearing life. As a result, I obtain between the diamonds and local carbonized portions of the metal that fill their pitted surface depressions, a physical interlock that more effectively retains the diamonds in the matrix than the bonds that are formed by the usual diamond setting methods. A similar physical interlock is formed by solidification of the matrix alloy within any depressions naturally or normally present in the surfaces of the diamonds.

In attempting to cast a metallic matrix about and above the diamonds, there is a potential difficulty caused by the tendency of the diamonds to become displaced by floating upwardly in the metal while it is in molten condition, due to the lower specific gravity of the diamonds. The invention obviates this difficulty by providing a method whereby the matrix metal, when it reaches a liquid state that would allow displacement of the diamonds, is quickly solidified just as soon as the alloy solution forms and before the diamonds have an opportunity to separate from their cavities in the mold and rise in the molten material.

The invention has a further important feature in that, where desirable, provision is made for simultaneously and in one operation bonding a matrix to both the diamonds and the shank or body of the tool. As will appear, by placing the diamonds, matrix metal and tool body in a refractory mold, and heating the mold and its contents in a furnace to the melting temperature of the matrix metal, while simultaneously exerting pressure on the latter through the tool body, it is possible to form an integrated diamond, matrix and body assembly in one simple operation.

The invention may perhaps be understood more readily and to better advantage without further preliminary discussion, from the following detailed description, throughout which reference is made to the accompanying drawing showing a typical form of apparatus for carrying out the method. In the drawing:

Fig. 1 is an elevational view of the apparatus showing the furnace, mold and its contents, in vertical section;

In carrying out the method, I first prepare a suitable mold of refractory material, the shape and contour of the mold conforming to the desired contour of the completed tool. The mold may be made of any suitable refractory material such as silica, clay mixtures or graphite, although for general purposes graphite is preferred. The typical form of mold 10 shown in the drawing is shaped to form a circular diamond drill, and comprises a body 11 and a central core 12 annularly spaced at 13 from the body, the entire mold being made of graphite compressed or otherwise integrated sufficiently to retain its form and shape. The cutting elements 14, typically individual diamonds, are placed in depressions or cavities 15 in the mold material at the bottom of space 13, and a suitable quantity of powdered matrix metal 16 is filled into the space directly upon the diamonds 14. A suitable plunger, not shown, is then fitted into the mold and pressed against the metallic powder 16 under sufficient pressure to cause the metal to intimately contact the diamonds 14 and to fill, in a more or less compact mass, the bottom portion of space 13.

After removing the plunger, a tubular shank or body portion 17 of the tool is inserted in the mold, as illustrated, the body 17 being shown typically as having a cylindric head portion 17a and a threaded pin 17b adapted to be screwed into the box section of a drill rod joint. A tubular plunger 18 of refractory material is inserted in the mold against the upper end of the tool body 17, and the filled mold is then placed in the heating chamber 19 of a suitable furnace diagrammatically illustrated by the walls 20.

Suitable provision is made for applying pressure to the powdered metal 16 while it is being heated, such means being shown typically as comprising a plunger rod 21 operated by a piston in the air cylinder 22, and extending through an opening 23 in the top wall of the furnace to bear against a refractory disc 24 placed on the top of plunger 18. Compressed air is delivered to cylinder 22 from supply line 25, selectedly through line 26 or line 27 under control of a four way valve 28, which also controls the exhaust to line 29. The downwardly applied air pressure on plunger 21, and therefore the compression pressure applied to the metal 16, is indicated by a suitable pressure gauge 30. Slight downward movements of the plunger 21 are shown by a suitable indicator 31, which may consist typically of a scale quadrant 32 stationarily mounted at 33 on the lower end of the cylinder 22, and an indicator arm 34 pivoted at 35 on the quadrant frame 36 and actuated by an integral arm 37 engaged within a ferrule 38 on the plunger 21. The indicator 34 may be centered or given any other suitable position on the scale 32, at any position of the plunger 21, by vertical adjustment of a sleeve 39 integral with the ferrule 38 and held in position on the plunger by set screw 40.

The mold and its contents are heated in an inert or reducing atmosphere, as may be provided by introducing to the heating chamber 19 a suitable gas, e. g. coal gas, natural gas, hydrogen, or a gaseous alcohol or hydrocarbon. By heating in a neutral or reducing atmosphere I avoid oxidation of the metals and diamonds at high temperatures, and also prevent the formation of oxidized films between the matrix 16 and diamonds 14, and between the matrix and bottom surface 41 of the tool body, that would otherwise weaken the bonds between them.

The mold assembly is heated in the furnace to a temperature sufficiently high to bring the powdered matrix metals 16 to at least a state of incipient plasticity, at which the metals will flow under the applied pressure, and preferably to a state of complete fluidity, in which the metals become completely liquid and form an alloy solution. The alloy composition 16 is selected, with reference to its melting point, so that the maximum required temperature will be below that at which the diamonds will become injured, and also below a temperature at which the shank or body 17 of the tool will become melted or deformed. In this connection, it may be mentioned that the tool body may be made of any metal or alloy capable of forming a bond with the matrix alloy 16, but having a melting point sufficiently high to prevent its being deformed during the casting process. In a tool of the particular form illustrated, I prefer to make the body 17 of iron or mild steel. In casting the matrix alloy about diamond cutting elements, the maximum temperature should not exceed 1600° C., and preferably is maintained between 1150° C. and 1400° C.

As the mold and its contents are being heated, plunger 21 is set to maintain a suitable pressure on the alloy 16. This pressure need not be great, but only sufficient to cause the alloy, when heated to its melting point, to collapse gas pockets or voids in the metal 16 when it reaches its melting temperature, and to cause the metal to conform accurately to the mold shape and flow against or assume intimate contact with the cutting elements 14 and the bottom surface 41 of the tool body. Pressure on the metal 16 of around 25 to 30 lbs. per sq. in. has given satisfactory results in producing a non-porous cast matrix bonded intimately to the diamonds and tool body.

Before the matrix alloy has become heated to its melting temperature, the plunger movement indicator 34 is set at some suitable index point on the scale 32. By thereafter closely observing the indicator 34, it is possible to determine immediately when the alloy 16 reaches melting temperature and converts to liquid form. At this point, plunger 21 is observed to move comparatively rapidly, and almost instantaneously, downward a short distance, which movement is indicated by rapid swinging of the indicator 34. Since the diamonds 14 have considerably lower specific gravity than the molten alloy 16, there may be a tendency for the diamonds to loosen from the mold recesses 15 and float upwardly within the metal. To prevent such displacement of the diamonds, the heat supply to the furnace is discontinued, as by cutting off the current where an electric furnace is used, immediately upon the observed sudden downward movement of plunger 21 indicating that the melting temperature of the alloy has been reached. The alloy thereupon quickly solidifies and retains the diamonds in proper position in the bottom cutting surface of the tool.

As previously mentioned, microscopic observations of diamonds about which the matrix alloy has been cast as described, show tiny surface depressions indicating that a chemical reaction has taken place between the diamond carbon and the metal alloy. As a result of this reaction, localized portions of the alloy at the diamond surfaces are carbonized, thus creating a chemical affinity between the matrix and diamonds, and a physical interlock is formed by the surface depressions in the diamonds becoming filled with the metal.

The invention contemplates broadly the use of any suitable metal or combination of alloy metals, to form the cutter element matrix. In general, the matrix composition will be selected in accordance with the particular type of tool being made and the purposes for which it is to be used. Taking for example a core drill of the illustrated form for use in diamond drilling, the matrix composition may be predetermined to best suit the conditions under which the drill is to be operated, and preferably will comprise selected alloy metals possessing the property of adhering to the surface of the diamonds to prevent them from loosening and falling out after the matrix is worn away below the equator of the diamonds. Also the matrix must have the necessary strength and abrasion resistant properties to prevent fracture and wearing away at such a rate as to expose the diamonds too rapidly. As a typical alloy suitable for average diamond drill operation and capable of adhering to the surface of the diamonds as described in the foregoing, I may use a powdered mixture of copper, 30% to 60%, nickel 60% to 30%, and minor percentages of precipitation hardening agents such as iron, silicon (e. g. ferro silicon or nickel silicon), chromium, titanium, manganese, beryllium, aluminum or boron. Particularly good results have been obtained using an alloy having a melting point around 1250° C., and composed of 47.5% copper, 47.5% nickel, 3% chromium, and 2% silicon, the percentages being by weight. Cobalt may be used in place of nickel, although the latter is preferred because of the lower melting temperature of the nickel alloy composition, also the superior affinity of this alloy for the diamonds, and the ability of the ingredients to form solid alloy solutions in all proportions.

Product aspects of the invention are claimed in my copending application Ser. No. 379,509, filed February 18, 1941 on Diamond cutting tools.

I claim:

1. The method of making cutting tools that includes, placing hard cutting elements in predetermined positions in contact with matrix metal in a refractory mold, heating said mold, cutting elements and metal to a temperature not greatly in excess of the melting point of the metal, exerting pressure on the metal to cause it to conform to the mold shape and to intimately embrace the cutting elements, maintaining the cutting elements in said positions while heated to the temperature of the metal, and cooling the metal to cause it to bond to said elements.

2. The method of making cutting tools that includes, placing diamond cutting elements in predetermined positions in contact with pulverulent matrix metal in a refractory mold, heating said mold, cutting elements and metal to a temperature at which the metal becomes melted so as to form a non-porous body when cooled, simultaneously exerting pressure on the metal sufficient to collapse gas pockets within the metal and cause the metal to conform to the mold and cutting element shapes, maintaining the cutting elements in said positions while heated to the temperature of the metal, and cooling the metal to cause it to bond to said elements.

3. The method of making cutting tools that includes, placing diamond cutting elements and a metallic tool body in contact with pulverulent matrix metal in a refractory mold, heating said mold, cutting elements, tool body and matrix metal to a temperature at which the metal is free-flowing under the applied pressure, simultaneously exerting on the matrix metal through said body a pressure sufficient to collapse gas pockets within the metal and cause the metal to conform to the shapes of the tool body and cutting elements, and then cooling the metal to cause it to bond to said elements and tool body.

4. The method of making cutting tools that includes, placing in a refractory mold pulverulent matrix metal in contact with individual diamonds and a tool body at the bottom and top, respectively, of said metal, heating the mold and its contents in a non-oxidizing atmosphere to a temperature at which the metal becomes fluid and has a specific gravity greater than that of the diamonds, simultaneously exerting pressure on said metal through the tool body, indicating the transition of the metal from solid to fluid state, and discontinuing heating of the mold and its contents in accordance with such indication to cause the metal to solidify and bond to said tool body and prevent the diamonds from floating upwardly in the metal.

5. The method of making cutting tools that includes, placing in a refractory mold individual diamond cutting elements in contact with and at the bottom of a body of matrix metal, applying pressure to said metal by a movable member, simultaneously heating said mold, cutting elements and metal to a temperature at which said metal becomes a fluid and has a specific gravity greater than that of said elements, and cooling and solidifying said metal when relatively sudden movement of said member indicates that said metal has become fluid, sufficiently soon to prevent said elements from floating upwardly in the metal.

6. The method of making cutting tools that includes, placing in a refractory mold pulverulent matrix metal in contact with individual diamonds and a tool body at the bottom and top, respectively, of said metal, applying pressure to said tool body and metal by a movable member, simultaneously heating said mold and its contents to a temperature at which said metal becomes fluid and has a specific gravity greater than that of said diamonds, and cooling and solidifying said metal when relative sudden movement of said member indicates that said metal has become fluid, sufficiently soon to prevent said diamonds from floating upwardly in the metal and to cause the metal to bond to the lower end of said tool body.

7. A cutting tool of the character described comprising diamond cutting elements embedded in and projecting out of a metallic matrix, said tool being formed by placing the diamond cutting elements in predetermined positions in contact with pulverulent matrix in a refractory mold, heating said mold, cutting elements and metal to a temperature at which the metal becomes melted so as to form a non-porous body when cooled, simultaneously exerting pressure on the metal sufficient to collapse gas pockets within the metal and cause the metal to conform to the mold and cutting element shapes, maintaining the cutting elements in said positions while heated to the temperature of the metal, and cooling the metal to cause it to bond to said elements.

8. A cutting tool of the character described comprising diamond cutting elements embedded in and projecting out of a metallic matrix, and a metallic tool body bonded to said matrix, said cutting tool being formed by placing said diamond cutting elements and said tool body in contact with pulverulent matrix metal in a refractory mold, heating said mold, cutting elements, tool body and matrix metal to a temperature at which the metal is free-flowing under the applied pressure, simultaneously exerting on the matrix metal through said body a pressure sufficient to collapse gas pockets within the metal and cause the metal to conform to the shapes of the tool body and cutting elements, and then cooling the metal to cause it to bond to said elements and tool body.

ARTHUR J. BEVILLARD.